J. S. CLARKE.
STEERING DEVICE FOR MOTOR VEHICLES.
APPLICATION FILED OCT. 7, 1907.

907,105.

Patented Dec. 15, 1908.

3 SHEETS—SHEET 1.

ATTEST
E. M. Fisher
L. F. Kimball

INVENTOR
John S. Clarke.
BY Fisher & Moser ATTYS.

J. S. CLARKE.
STEERING DEVICE FOR MOTOR VEHICLES.
APPLICATION FILED OCT. 7, 1907.

907,105.

Patented Dec. 15, 1908.

3 SHEETS—SHEET 2.

ATTEST
E. M. Fisher
L. F. Kimball

INVENTOR
John S. Clarke.
BY Fisher & Woert ATTYS

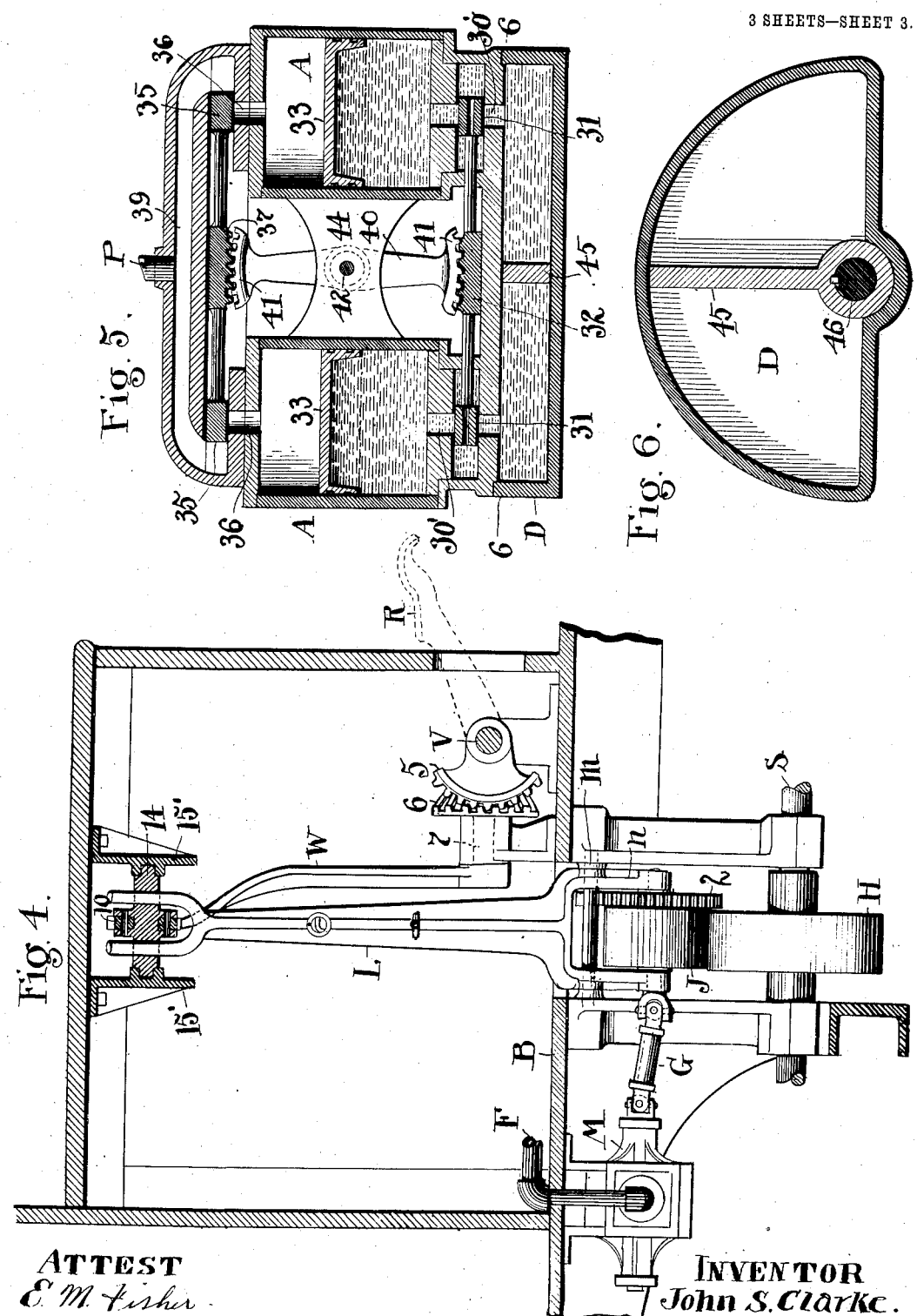

UNITED STATES PATENT OFFICE.

JOHN S. CLARKE, OF EAST CLEVELAND, OHIO.

STEERING DEVICE FOR MOTOR-VEHICLES.

No. 907,105.  Specification of Letters Patent.  Patented Dec. 15, 1908.

Application filed October 7, 1907. Serial No. 396,254.

*To all whom it may concern:*

Be it known that I, JOHN S. CLARKE, a citizen of the United States, residing at East Cleveland, in the county of Cuyahoga and State of Ohio, have invented certain new and useful Improvements in Steering Devices for Motor-Vehicles, and do declare that the following is a full, clear, and exact description of the invention, which will enable others skilled in the art to which it appertains to make and use the same.

My invention relates to starting and steering devices for automobiles and other road machines, and the invention consists in means adapted to utilize pneumatic or other expansible fluid for starting the engine and steering the vehicle, all substantially as shown and described and particularly pointed out in the claims.

Figure 1:
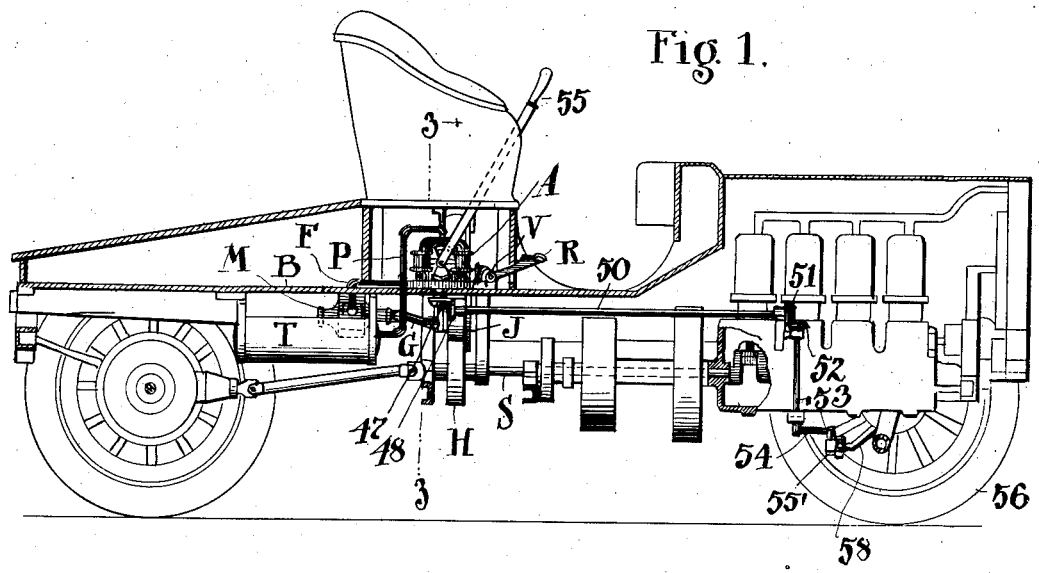
Figure 2:
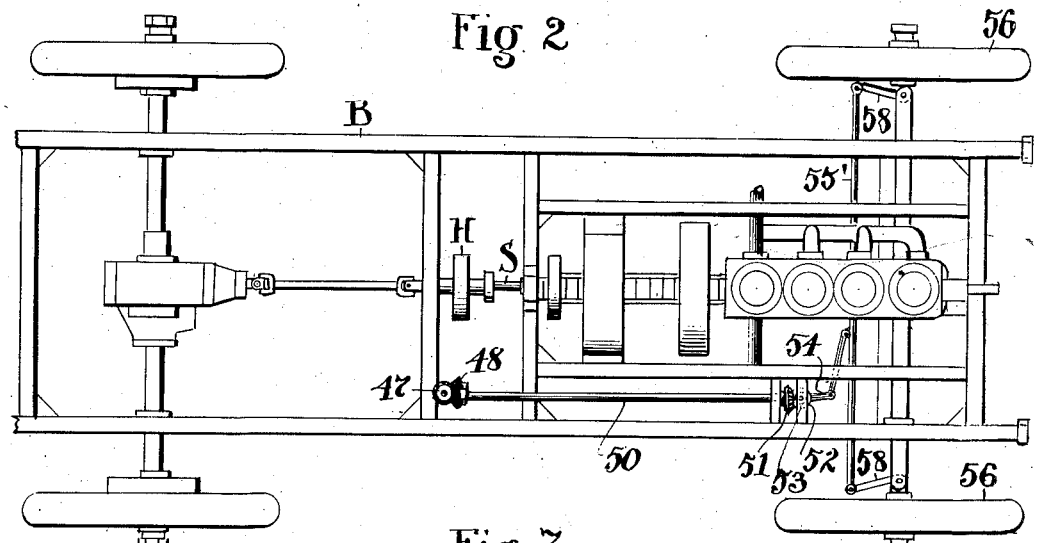
Figure 7:
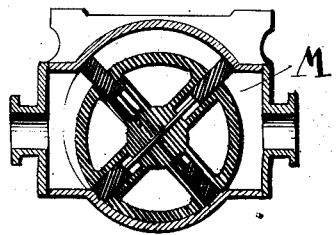
Figure 3:
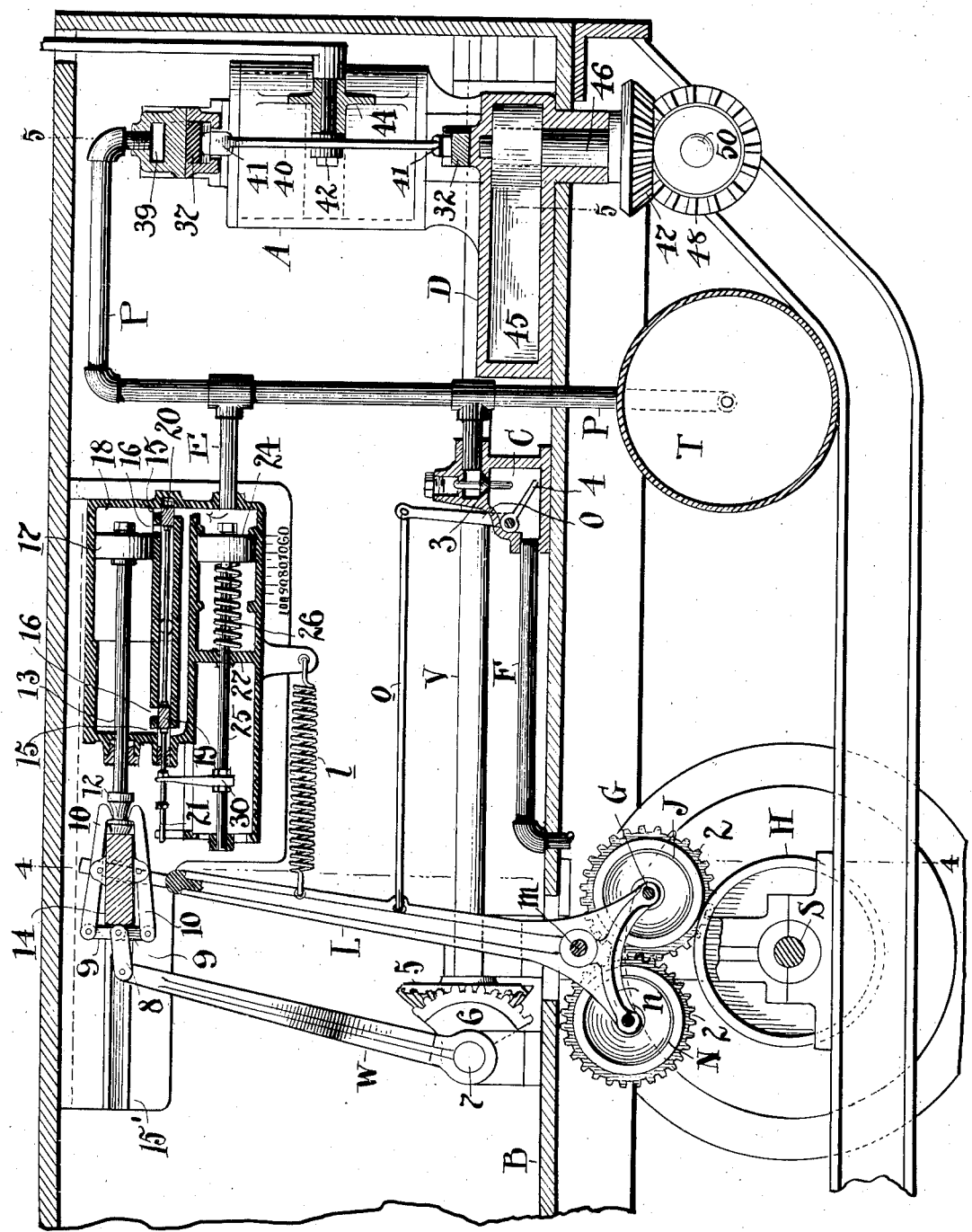

In the accompanying drawings, Figure 1 is a side elevation of a machine embodying my invention, and Fig. 2 is a plan view of the machine with the body removed. Fig. 3 is an enlarged vertical cross section of the seat and parts beneath, substantially on line 3—3 Fig. 1. Fig. 4 is a cross section substantially on line 4—4, Fig. 3, and Fig. 5 is a view substantially on line 5—5, Fig. 3, showing the steering cylinders and chamber. Fig. 6 is a plan view on cross line 6—6, Fig. 5, showing the steering piston, and Fig. 7 is a cross section of the motor and pump.

The machine used herein for purposes of illustration has driving engines and a drive or power shaft S arranged to transmit power to the rear axle in any approved way, but the invention is to be understood as equally applicable to machines of other types as well, large or small.

Broadly the invention comprises means, first, for maintaining a given supply of compressed air, or its equivalent, on the machine; secondly, for utilizing the air or other agent for cranking up or starting the engine, and, thirdly, for steering the machine therewith. To these several ends I employ a pneumatic or like tank, T, in which I carry a pressure of say 60 to 100 pounds, more or less, and in which the pressure is automatically maintained at a predetermined maximum by the operations of the machine, as will presently be seen. The said tank is suitably fixed beneath the body B behind the seat, in this instance, and a single pipe P communicates therewith. This pipe has sundry connections here and there, as E and F. Pipe F connects with pipe P at one end through valve box or chamber C and at the other end with air pump and motor M. Said part M is adapted to be used interchangeably as a pump or motor and may be of the rotary type shown or of any other suitable kind, and is driven from main shaft S by friction wheel H thereon when used as a pump and is adapted to be engaged operatively by either wheel J or N on divergent arms n on controlling lever L according to the character of work to be done. As shown in Figs. 3 and 4 friction wheel J is engaged with friction wheel H, and the parts are in air compressing relations. Connections also are made by flexible shaft G between pump M and the shaft of wheel J, and lever L is pivoted at m so as to swing said friction wheels J and N on the arc of a circle into or out of working relations. Said wheels also have constantly meshed gears 2, so that when either is engaged with wheel H both rotate. As seen in Fig. 3, wheel N is idle.

When the engine is to be started instead of employing the usual hand-crank for this purpose I employ pneumatic pressure through the foregoing devices, the pump M becoming a motor as it is reversed and driven by back pressure from tank T. To this end lever L is swung in the opposite direction and friction wheel N brought down into operating contact with wheel H. This also changes the position of valve —3— in chamber C, opening said valve by means of crank arm O, which is connected with lever L by link o and has a finger or wing 4 adapted to engage beneath the stem of valve 3 and lift the same. Spring l retracts lever L to normal position after being used for starting purposes. To effect these changes from the driver's seat I employ a line of mechanism beginning with treadle R on operating shaft V, which has a gear segment 5 meshing with a like segment 6 on rock-shaft 7 on the bottom of arm W. At its top or free end arm W engages by link 8 with toggle links 9, connected respectively with the outer ends of locking catches 10 for head 12 on piston shaft 13. A guide member 14 is engaged in bifurcations at or on the upper end of lever L and at its ends is adapted to slide in parallel grooves or channels in guide plates 15′ In operation, as to these parts, when treadle R is depressed by the foot of the driver a very little, shaft V is rotated and arm W thrown to the rear correspondingly, thus liberating catches 10 from piston rod head 12 and carrying lever L far enough to the left, Fig. 3, to throw power wheel N down upon wheel H. A comparatively slight movement effects these changes. When this occurs air controlling valve 3 is opened by part 4 and pump M is utilized as a motor, driving shaft S through wheel N and starting the engine. This being done, treadle R is released by the driver and all the parts involved resume their original and normal position, Fig. 3. However, this so-called normal position is subject to modification, because when the pneumatic tank is at its maximum pressure further pumping is for the time suspended, and such maximum is automatically maintained as hereinbefore referred to. To this end piston rod 13 carries piston 17 in casing 18, which has inlet and exhaust ports 15 and 16 respectively at each end on opposite sides of piston 17 which are controlled respectively by valves 19 and 20 on valve rod 21 in casing 18. The said valve rod is controlled by piston 24 fixed on rod 25 in the bottom of casing 18 and backed by spiral spring 26 on said rod 25 resting against diaphragm 27. An arm 30 is fixed on rod 25 and adapted to play between stops on valve rod 21, whereby the valves thereon are moved to cover or uncover inlet or exhaust ports 15 and 16 as the conditions may require. For example, as shown, Fig. 3, air compression is in progress. When compression reaches the fixed limit the pressure will push piston 24 back against spring 26, and when the end of the stroke is reached the positions of valves 19 and 20 will be reversed and exhaust will be through port 16 past valve 19 and valve 20 will become inlet valve through port 15. This will move lever L to the left, Fig. 3, and lift wheel J out of action with wheel H and stop the pump, but the movement will not be far enough to open valve 3, nor to throw wheel N into action, and pneumatic equilibrium will be thus maintained, the pump working again only when the pressure drops below the maximum to which the parts have been adjusted.

Now, passing to the steering mechanism, I also use pneumatic pressure from tank T for this purpose, plus a suitable liquid, as oil or water, in the respective cylinders A and piston chamber D. Chamber D is entirely filled with liquid at all times, and cylinders A are partially filled and in communication with chamber D through holes 30' controlled by valves 31 on rack-bar 32. Said valves slide in pockets between the sets or pairs of openings 30' for each cylinder. Rigid floats or diaphragms 33 rest on the fluid in cylinders A and keep the air over them separate from the liquid beneath.

Over cylinders A are valves 35 controlling compressed air inlets 36 through duct 39 and pipe P, and rack-bar 37 carries said valves at its ends in slidable relation to or over openings 36.

Rocking arm 40 has toothed segments 41 at its ends which engage rack-bars 32 and 37 respectively, and is pivoted at its center on pivot 42 in webbing 44 between cylinders A. Steering piston 45 is pivotally supported on a post 46 at one end in bottom chamber D and is adapted to turn or swing in said chamber on said post or pivot, and beveled gear 47 is fixed on said post outside chamber D and meshes with bevel gear 48 on transmitting rod or shaft 50. Said rod extends to the front of the machine and carries bevel gear 51 operatively engaged with a like gear 52 on the upper end of vertical shaft 53 through which power is transmitted by arm 54 thereon to transverse rod 55' and the wheel steering arms 58 engaged with the ends of said rod. The operator or driver has lever 55 at his seat which is engaged with rocking arm 40 at its pivot and through said arm controls valves 31 and 35. This defines one way of communicating the steering power from piston 45 to the wheels, but by no means the only way, and I may employ any available or equivalent means for this purpose.

From the foregoing it will be clear that the driver has the steering apparatus under complete and easy control by lever 55, and that he can cause the steering piston to swing under pressure to either side and produce corresponding position in the front wheels 56 to which guidance is thus communicated by the transmitting parts above described. In this operation the liquid in chamber D and partially in cylinders A is to be regarded practically as a mechanical element adapted to positively control piston 45 and throw it to either side by air pressure upon the same in cylinders A. To these ends both sets of valves, 31 and 35, are conjointly operated by lever 55 and in the same measure or degree, and as pressure is admitted to one cylinder through duct 39 the other cylinder is correspondingly opened to the exhaust, and valves 31 are also correspondingly opened to admit liquid from the cylinder under pressure to chamber D against piston 45, while the liquid on the other side of said piston is permitted to flow in equal measure up into the corresponding cylinder from which the air, for the time, is exhausting. First it may be one cylinder and then the other that gets under pressure or exhausts, and the liquid plays from one to the other and has entire control of piston 45 in these manipulations from and through hand lever 55. Obviously, a very slight movement of said lever may suffice in any case, for a very slight movement of the respective valves 31 and 35 is required to get both the necessary pressure and relief in the respective cylinders. It is to be observed in this connection that piston 45 becomes liquid locked and cannot move in either direction when the valves 31 are closed, as in Fig. 5. The steering wheels likewise will be locked when this occurs and they are played to right or left from a direct line by control of lever 55 and the play of liquid between cylinders A and chamber D under the fluid pressure from above as herein described, and the diaphragms or sliding covers 33 for the liquid are packed about their edges but still adapted to move up and down more or less as these operations may require. It will be noticed that the side bearing of these parts 33 is such as to insure their uniform movement without getting locked in the sides of the cylinders.

The parts A are referred to herein as cylinders and as such they are denominated throughout the claims for purposes of designation, but they need not necessarily be of cylindrical form. Air, steam, or other agent can be used for steering as herein described, and a steam propelled auto, especially, can use steam instead of air. The air tank is designed to be of a capacity adapted to operate the steering mechanism for a number of days, and the same source can be used for supplying air brakes.

Nothing arbitrary is intended as to the location of parts, and they may severally be located as a particular construction of auto may find most convenient. Hence, also, the various mechanical connections here and there may be modified to suit conditions, and such changes are regarded as within the spirit and object of my invention.

The word or term "engine" herein is to be understood as comprehensive and not limited to any special type or style of power source for the machine.

What I claim is:—

1. A steering mechanism for motor vehicles operating with a liquid control and fluid pressure thereon, comprising a quadrant shaped chamber adapted to be filled with liquid, a power shaft therein and a piston fixed on said shaft and steering connections between said shaft and the steering wheels of the vehicle, in combination with means to operate said piston comprising a set of expansion cylinders adapted each to be partially filled with liquid and pressure fluid respectively, passages connecting said cylinders with said piston chamber on opposite sides of said piston and a valve for each of said passages, pressure fluid inlet openings to the top of said expansion cylinders and a slide valve to control said openings, and means to operate all said valves simultaneously comprising a hand lever and a rocking arm controlling said valves.

2. A steering mechanism for motor vehicles comprising a quadrant shaped piston chamber, a piston adapted to oscillate therein and a post rotatable with said piston and projected through the wall of said chamber and a gear thereon and transmitting mechanism from said gear to the steering axle of the vehicle, in combination with two expansion chambers and passages therefrom into said piston chamber provided with valves, a fluid receiving chest and a valve in said chest controlling the flow of fluid to said chambers, and mechanism for simultaneously controlling all said valves comprising a rocker arm and parts engaged thereby operatively connected with said valves respectively and a lever controlling said arm.

3. A steering apparatus for motor vehicles comprising a piston chamber and a piston adapted to oscillate therein, expansion chambers open to said piston chamber on opposite sides of the piston, a valve adapted to direct pressure fluid into either of said expansion chambers and to exhaust from the other at the same time, slidable liquid locking valves in the passages from said expansion chambers to said piston chamber, and mechanism to control all said valves simultaneously comprising a pivoted lever, a rocking arm controlled thereby and means engaging said valves respectively having operating engagement with said arm in combination with power transmitting mechanism leading from said piston to the steering wheels of the vehicle.

4. A motor vehicle having steering mechanism adapted to be operated by combined liquid and pneumatic pressure comprising a liquid chamber and a piston therein and operating connections from said piston to the wheels to be steered, a pair of cylinders over said liquid chamber, a fluid pressure tank having ducts leading to said cylinders, valves at the bottom and top respectively of said cylinders adapted to govern the flow of fluid and liquid respectively to said cylinders and said chamber, and mechanism adapted to control all of said valves simultaneously, comprising a centrally pivoted rocker arm engaging said valve controlling mechanism at its ends and a lever at the pivot of said arm.

5. In a road vehicle, a steering mechanism comprising a liquid chamber and a power piston therein connected with the steering wheels of the vehicle, a set of combined fluid and liquid chambers open to said liquid chamber on opposite sides of said piston, a fluid compression tank and pipe connections therefrom to said fluid and liquid cylinders, and a pump and mechanism to drive the pump to store said tank with pressure, said mechanism operatively connected with the running gear of the vehicle, and having an automatic controlling device comprising a set of cylinders and pistons therein and valved connections therefor open to said fluid compression tank.

6. In a road vehicle, steering mechanism connected with the steering wheels thereof and means to control said mechanism comprising a liquid actuated piston, means to maintain fluid pressure on said liquid comprising a supply tank, a pump to store said tank, means operatively connected with said pump having actuating connections with the running gear of the vehicle, and fluid-actuated means to automatically throw said pump into and out of action according to the pressure in said tank and comprising a pair of cylinders and pistons therein with valved connections therefor open to said supply tank.

7. In a road vehicle, steering mechanism adapted to be controlled by liquid under pressure and means to bring fluid pressure to bear on said liquid comprising a fluid storage tank, a pump driven from the vehicle to store said tank, and means to automatically control the operation of the pump from said tank comprising a rocking lever, fluid governed means to automatically actuate said lever and throw the pump into operation and consisting of a cylinder and piston having fluid connections with said tank, and valves for said connections having a spring pressed piston to actuate the valves and operatively controlled by the pressure from the tank.

8. In motor vehicles, steering mechanism comprising a liquid chamber, a piston therein and operating connections therefrom to the front wheels of the machine, a set of cylinders over said liquid chamber open respectively to the opposite sides of said piston and valves to close the openings between said cylinders and said chamber, and means to control said valves, in combination with a fluid supply tank having fluid connection with said cylinders and having fluid pressure maintaining mechanism comprising a pump and drive connections therefor, and a set of pistons for throwing said drive connections into and out of action, and said pistons having fluid passages open to said tank and valves therein controlled by one of said pistons.

9. A steering mechanism for vehicles having a fluid pressure device operatively connected with the steering wheels and provided and connected with a fluid pressure tank, combined with means to maintain the pressure within the tank having operating connection with the driving mechanism of the vehicle, said means comprising a pair of cylinders having pistons therein and fluid passages open to the pressure tank provided with valves adapted to be opened and closed by the movement of one of said pistons.

10. A steering mechanism for vehicles comprising a fluid pressure device operatively connected with the steering wheels and a fluid pressure tank having fluid connection with said device, in combination with means to maintain the pressure automatically within said tank comprising a pump having operating mechanism connected with the driving mechanism of the vehicle and a set of cylinders having pistons to control the operation of the pump through said operating mechanism, one of said pistons having a backing spring and valved connections to control the flow of fluid from the tank to the other piston.

In testimony whereof I sign this specification in the presence of two witnesses.

JOHN S. CLARKE.

Witnesses:
R. B. MOSER,
F. C. NUESSUN.